United States Patent
Watanabe et al.

(10) Patent No.: US 6,697,046 B2
(45) Date of Patent: Feb. 24, 2004

(54) COORDINATE INPUT DEVICE FOR PREVENTING DELAMINATION OF TRANSFER PORTION

(75) Inventors: Takeshi Watanabe, Fukushima-ken (JP); Hideto Sasagawa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 266 days.

(21) Appl. No.: 09/891,748

(22) Filed: Jun. 26, 2001

(65) Prior Publication Data

US 2002/0015023 A1 Feb. 7, 2002

(30) Foreign Application Priority Data

Jun. 28, 2000 (JP) ........................................ 2000-195231

(51) Int. Cl.[7] .................................................. G09G 5/08
(52) U.S. Cl. ........................ 345/157; 345/173; 345/174
(58) Field of Search ................................. 345/173, 174, 345/157; 178/18.03, 18.05; 341/34; 250/214 R

(56) References Cited

U.S. PATENT DOCUMENTS

| | | | | |
|---|---|---|---|---|
| 4,705,919 A | * | 11/1987 | Dhawan | 178/18.03 |
| 4,761,547 A | * | 8/1988 | Torihata et al. | 250/214 R |
| 5,159,159 A | * | 10/1992 | Asher | 178/18.05 |
| 5,329,291 A | | 7/1994 | Chen | 345/157 |
| 5,589,857 A | * | 12/1996 | Tanahashi et al. | 345/174 |
| 5,844,506 A | * | 12/1998 | Binstead | 341/34 |
| 6,473,074 B1 | * | 10/2002 | Okahashi | 345/174 |

* cited by examiner

Primary Examiner—Dennis-Doon Chow
Assistant Examiner—Uchendu O. Anyaso
(74) Attorney, Agent, or Firm—Brinks Hofer Gilson & Lione

(57) ABSTRACT

A coordinate input device in which a first electrode plate having a resistor layer and a pair of electrodes in contact with the resistor layer formed successively on a substrate along two opposing sides of a film substrate with the top end of a wiring pattern led out of the electrode to the vicinity of other sides being formed as a transfer forming portion, and a second electrode plate having a resistor layer, a pair of electrodes and wiring patterns formed successively on a substrate, are joined with the respective resistor layers opposed to each other and the electrodes being arranged at a right angle with each other, wherein bridge portions are formed near the transfer portions of the first electrode plate, whereby the stress exerting on the transfer portion caused by expansion or shrinkage of the coordinate input device due to the change of the circumstantial temperature is reduced to prevent delamination of transfer portion and improve the reliability.

3 Claims, 7 Drawing Sheets

COORDINATE INPUT DEVICE FOR PREVENTING DELAMINATION OF TRANSFER PORTION

BACKGROUND OF THE INVENTION

1. Field of the Invention

This invention concerns a coordinate input device and, more in particular, it relates to a structure of a transfer portion with improved reliability of a coordinate input device when used, particularly, under a circumstance in a wide temperature range.

2. Description of the Related Art

In a case where the surface of a flat plate is designated by a coordinate pointer such as a pen or a finger, or a trace is drawn by moving the designated point, a coordinate input device in which a cursor indicates a corresponding coordinate position on a computer display or a cursor is moved to draw a trace is referred to as a tablet and has been used generally.

FIG. 4 shows a first example of an existent structure of a coordinate input device. FIG. 4 is a plan view illustrating a coordinate input device of a first example in an exploded state.

FIG. 4A is a plan view of an upper electrode plate 102 of the coordinate input device of the first example and FIG. 4B is a plan view of a lower electrode plate 103 of the coordinate input device of the first example.

The coordinate input device of the first example shown in FIG. 4 comprises an upper electrode plate 102, a lower electrode plate 103, a flexible printed circuit board (hereinafter simply referred to as FPC) 104 as a connection terminal with a control driving section (not illustrated)

The upper electrode plate 102 shown in FIG. 4A comprises, on a film substrate 100, an ITO (indium tin oxide) resistor layer 105a, a pair of parallel elongated rectangular electrodes 106a and 106b, transfer portions 109a and 109b formed near both ends of the electrodes 106a and 106b and an insulation resist 108a laminated successively.

Further, the lower electrode 103 shown in FIG. 4B comprises, on a glass substrate 101, an ITO resister layer 105b, an insulation spacer (not illustrated), a pair of elongated rectangular electrodes 106c and 106d parallel with each other, wiring patterns 107a–107d, the transfer portions 109c and 109d described above and an insulation resist 108b laminated in this order, to which the FPC 104 is connected.

The electrodes 106a and 106b shown in FIG. 4A are formed along opposing shorter sides of the film substrate 100 respectively, and the insulation resists 108a and 108b are formed along the shorter sides of the substrate 100 so as to cover the electrodes 106a and 106b.

Further, the insulation resists 108a and 108b are provided with uncovered portions near both ends of the electrodes 106a and 106b and the portions constitute transfer portions 109a and 109b.

The electrodes 106c and 106d shown in FIG. 4B are formed along opposed longer sides of the glass substrate 101 respectively.

Further, electrodes 106e and 106f are formed along the shorter sides of the glass substrate 101 on the previously formed insulation resist and they are placed at positions corresponding to the electrodes 106a and 106b of the upper electrode 102.

The lower electrode plate 103 shown in FIG. 4B is formed with an insulation resist 108c along four sides thereof, the insulation resist does not cover the portions corresponding to the transfer portions 109a and 109b disposed near both ends of the electrodes 106a and 106b of the upper electrode 102 and the uncovered portions constitute transfer portion 109c and 109d.

In FIG. 4B, wiring patterns 107c, 107d, 107a and 107b are connected to the right of the electrode 106c, at the right end of the electrode 106d, and the upper ends of the electrodes 106e and 106d, respectively, and the other ends of the wiring patterns 107a to 107d are connected with the FPC 104.

The insulation resist 108c is formed along four sides of the lower electrode plate 103 so as to cover the electrodes 106c to 106f and the wiring patterns 107a to 107d.

When the coordinate input devices is assembled, the upper electrode plate 102 and the lower electrode plate 103 are joined at the position of opposing the ITO resistor layers 105a and 105b, arranging, the electrodes 106a and the 106c at a right angle, and abutting the transfer portion 109a of the upper electrode plate 102 with the transfer portion 109c of the lower electrode plate 103 and the transfer portion 109b of the upper electrode plate 102 with the lower electrode plate 109d.

Then, the abutted transfer portions are integrated by heating and solidification.

The circuit from the electrodes 106a to 106d to the FPC 104 shown in FIG. 4 has such a structure that the electrodes 106a and 106b are connected by way of the transfer portions 109a and 109b to the electrodes 106e and 106f provided with the transfer portions 109c and 109d of the lower electrode plate 103 and connected by way of the wiring patterns 107a and 107b of the lower electrode plate 103 to the FPC 104 in the upper electrode plate 102, while the electrodes 106c and 106d are connected by way of the wiring patterns 107c and 107d to the FPC 104 in the lower electrode plate 103.

The coordinate input device described above has been incorporated in mobile equipment and the working conditions have become increasingly severe.

It is necessary that the mobile equipment operate stably over a wide range of temperatures, for example, from −30° C. to 70° C. and, naturally, it is also necessary for the coordinate input device mounted thereon to secure stable operation in the temperature range described above.

However, in the structure of the existent coordinate input device of the first example described above, since a film substrate is used for the upper electrode plate 102 and the glass substrate is used for the lower electrode plate 103 in order to adopt an advantageous structure in view of the operationability and the durability, a problem exists. In temperatures that are greatly different from the temperature upon bonding both of the electrode plates, stress generated by the difference of the thermal expansion coefficient between the film substrate and the glass substrate and by expansion and shrinkage of an air layer in a space between both of the electrodes is exerted on the transfer portions 109a to 109d connecting the circuits of the upper electrode plate 102 and the lower electrode plate 103 to defoliate the transfer portions and result in disconnection of the connection circuit to the driving control section.

Then, as one of means for solving the problems, it has been known a method of constituting the film substrate used for the upper electrode plate as a two-layer structure formed by appending to film substrates of different thickness.

FIG. 5 shows a partial cross sectional structure of an upper electrode plate 202 using a film substrate of a two-layered structure as a second example of the existent coordinate input device. The upper electrode plate 202 of the second example shown in FIG. 5 has an identical constitution with that of the upper electrode 102 of the first existent example shown in FIG. 4A except for using a film substrate 220 of the two-layered structure.

The upper electrode plate 202 shown in FIG. 5 as a fragmentary cross sectional structure uses a film substrate 221 made of polyethylene terephthalate (hereinafter simply referred to as PET) of 125 µm thickness and a film substrate 222 made of PET of 25 µm thickness bonded and secured to each other by an adhesive 223 of about 25 µm thickness as a film substrate 220, in which an ITO resistor layer 205, an electrode 206, and an insulation resist 208 are formed successively on the side of the film substrate 222 of 25 µm thickness.

The thickness of the film substrate 220 in the upper electrode plate 202 of the second existent example is 175 µm and the thickness of the film substrate 100 used for the upper electrode plate 102 of the first existent example shown in FIG. 4A is also 175 µm.

However, since the film substrate 220 of the second existent example has a two-layered structure, an effect of moderating the stress due to expansion and shrinkage of the film substrate 221 of 125 µm thickness is exerted by the fluidity of the adhesive 223 put between the film substrates 221 and 222.

That is, in the coordinate input device of the second existent example having the upper electrode 202 using the film substrate 220, most of the stress exerted on the transfer portion is from the film substrate 222 of the thickness of 25 µm. In the first existent example shown in FIG. 4, the stress exerting on the transfer portions 109a to 109d is a stress from the film substrate 100 of 175 µm thickness.

When comparing them to each other, it is apparent that the stress exerted on the transfer portions of the coordinate input device of the second existent example is greatly reduced.

Accordingly, in the second existent example, the transfer portions are less defoliated to improve the reliability of the coordinate input device.

However, the film substrate 220 of the two-layered structure described above involves a problem that the structure is complicated and, accordingly, the production cost is high and it is not suitable to the present situation where cost competition becomes more important as mobile equipment becomes more popular and further reduction of cost has been demanded.

In view of the above, as a method of preventing the detamination of the transfer portions with no increased cost as in the film substrate 220 of the two layered structure described above, a method of narrowing the distance of the transfer portions corresponding to the pair of electrodes has been adopted, in order to minimize the effect of the dimensional change on the transfer portions due to expansion and shrinkage of the film substrate.

FIG. 6 and FIG. 7 show a coordinate input device using the method of narrowing the distance between the transfer portions as a third example.

FIG. 6A is a plan view of an upper electrode plate 302 of a coordinate input device as viewed on the side of resistor layer 305a, while FIG. 6B is a plan view of a lower electrode plate 303 of a coordinate input device as viewed on the side of the resistor layer 305b in the third existent example.

Further, FIG. 7 is a view illustrating a fragmentary cross sectional structure of the coordinate input device of the third existent example. For the constituent elements shown in FIG. 7, the constituent elements identical with those shown in FIG. 6 carry the same reference numerals for which explanation is omitted or simplified.

The upper electrode plate 302 of the third existent example shown in FIG. 6A comprises an ITO resistor layer 305a formed on a substrate 302a, elongated rectangular electrodes 306a and the 306b formed along shorter sides of the substrate 302a, a wiring pattern 307, transfer portions 309a and 309b and an insulation resist 308a.

The lower electrode plate 303 shown in FIG. 6B comprises an ITO resistor layer 305b formed on a substrate 302b, elongated rectangular electrodes 306c and the 306d formed along longer sides of the substrate 302b, a wiring patterns 307c and 307d, transfer portions 309c and 309d and an insulation resist 308b.

Reference numeral 304 designates an FPC as a connection terminal to a driving control section (not illustrated).

In FIG. 6A, a transfer forming portion 310a is disposed to the upper end of the electrode 306a, the wiring pattern 307 is connected to the upper end of the electrode 306b and a transfer forming portion 310b is disposed to the other end of the wiring pattern.

Further, the insulation resist 308a is formed along four sides of the upper electrode plate 302 so as to cover the electrodes 306a and 306b, the wiring pattern 307 and the transfer forming portions 310a and 310b, but a portion not covered with the insulation resist 308a is disposed at a central portion of each of the transfer portions 310a and 310b and the uncovered portions constitute the transfer portions 309a and 309b.

In FIG. 6B, wiring patterns 307c and 307d are connected near the right end of the electrode 306c and at the right end of the electrode 306d, respectively.

Further, a transfer forming portion 310c is disposed at the right upper end of the lower electrode plate 303 and a transfer forming portion 310d is disposed at a position rightward to the upper end center of the lower electrode plate 303. The positions correspond respectively to the transfer forming portions 310a and 310b of the upper electrode.

The wiring patterns 307a and 307b are connected respectively to the transfer forming portions 310c and 310d.

Each of the wiring patterns of the lower electrode 303 is connected with the FPC inserted between the transfer forming portions 310c and 310d.

An insulation resist is formed along four sides of the lower electrode 303 so as to cover the electrodes 306c and 306d, the wiring patterns 307a to 307d and the transfer forming portions 310c and 310d of the lower electrode 303 shown in FIG. 6B.

However, a portion not covered with the insulation resist is disposed at a central portion of each of the transfer forming portions 310c and 310d at a position corresponding to the transfer portions 309a and 309b of the upper electrode and the uncovered portions constitute the transfer portions 309c and 309d.

When the coordinate input device of the third existent example shown in FIG. 6B is assembled, the upper electrode plate 302 and the lower electrode plate 303 are joined by opposing the resistor layers 305a and 305b, arranging the electrode 306a and the 306c at a right angle, and at the position of abutting the transfer portion 309a of the upper electrode plate 302 with the transfer portion 309c of the lower electrode plate 303 and the transfer portion 309b of the upper electrode plate 302 with the transfer portion 309d of the lower electrode plate 303.

Then, the abutted transfer portions are integrated by heating and solidification.

FIG. 7 is a view showing a fragmentary cross sectional structure of a coordinate input device of a third existent example, in a state where the lower electrode plate 303 formed by successively laminating the ITO resistor layer 305b, the electrode 306c and the insulation resist 308b on the glass substrate 321 and the upper electrode plate 302 formed by successively laminating the ITO resistor layer 305a, the electrode 306a, and the insulation resist 308a on the film substrate 322 are bonded, with the ITO resistor layers 305a and 305b being opposed to each other.

In the third existent example, the circuit structure to the FPC 304 shown in FIG. 6 is such that the electrodes 306a and 306b are connected by way of the transfer portions 309a and 309b to the transfer portions 309c and 309d and connected by way of the wiring patterns 307a and 307b of the lower electrode plate 103 to the FPC 304 in the upper electrode plate 302, while the electrodes 306c and 306d are connected by way of the wiring patterns 307c and 307d to the FPC 304 in the lower electrode plate 303.

In the coordinate input device of the third existent example, as shown in FIG. 6, since the gap between the transfer portions 309a and 309b is made narrower than the gap between the transfer portions 109a and 109b of the second existent example shown in FIG. 4, the amount of change of the gap in the transfer portion upon expansion and shrinkage of the film substrate can be decreased to reduce the load on the transfer portions 309a and 309b.

Further, in the coordinate input device of the third existent example, the wiring pattern 307 is formed along one side of the upper electrode plate 302 in order to narrower than the gap between the transfer portions 309a and 309b.

However, since it is necessary that the equi-potential line formed by the pair of electrodes 306a and 306b is in parallel with the electrodes 306a and 306b upon use of the coordinate input device, the wiring pattern 307 is insulated by the insulation resist 308 from the ITO resistor layer 305a.

While it is not necessary to form the insulation resist on the upper electrode plate 102 of the first existent example, the insulation resist 308a has to be formed on the upper electrode plate 302 in the third existent example.

In view of the above, the third existent example involves a problem that increase of the manufacturing cost is inevitable due to the increase of the number of steps.

This invention has been accomplished in order to overcome the foregoing problems and intends to provide a coordinate input device capable of preventing delamination of transfer portions and improving the reliability at a reduced cost.

SUMMARY OF THE INVENTION

For attaining foregoing object, this invention has the following constitution.

In a coordinate input device according to this invention, a first electrode plate having a resistor layer, a pair of electrodes disposed along opposing two sides of a substrate, a wiring pattern led from the electrodes to the vicinity of other one side, a transfer portion disposed at the top end of the wiring pattern and a second electrode plate having a resistor layer, a pair of electrodes and a wiring pattern are bonded with the surfaces of each of the resistor layers being opposed and with the electrodes being arranged at a right angle to each other wherein a bridge portion through which the wiring pattern passes is disposed near a transfer forming portion of the first electrode plate.

That is, it is designed such that a bridge portion through which the wiring pattern passes is disposed in the midway of a circuit connecting the electrode and the transfer portion in the first electrode plate, thereby separating the electrode plate into a electrode portion and a transfer portion and moderating the stress caused by expansion and shrinkage of the substrate exerting on the transfer portion by the bridge portion and preventing delamination of the transfer portion.

Further, since the equi-potential line parallel with the electrodes formed by the electrode no more undergoes the effect of the electric field by the wiring pattern led out of the electrode by the separation of the electrode portion and the transfer portion by the bridge portion, it is not necessary to cover the wiring pattern as far as the transfer portion with the insulation resist.

Accordingly, since the electrode plate is completed only by the step of forming the resistor layer on the substrate and the step of forming the electrode and the wiring pattern, the cost can be reduced by the simplification of the steps.

Further, the coordinate input device can provide a structure in which the first electrode plate has a concave portion formed on one side of the substrate and convex portions defined with the concave portion on both sides thereof and a transfer portion is disposed on the convex portion.

That is, since the transfer portion is disposed on the convex portions disposed on both ends for one side of the electrode plate, stress for the electrode portion or the transfer portion generated by expansion and shrinkage of the substrate always exerts by way of the bridge portion to other portion constituting the electrode plate.

Accordingly, the stress caused by the expansion and shrinkage is moderated by the bridge portion and the reliability of the transfer portion can be improved further.

Further, the bridge portion connecting the transfer portion and the electrode portion can be formed by disposing a recess to the substrate near the transfer portion.

That is, since a substrate having a shape in which the transfer portion and the electrode portion are separated by the bridge portion can be manufactured by fabricating a shape having a recess near the transfer forming portion in the step of fabricating the substrate into a desired shape, it can avoid increased cost by the addition of steps.

BRIEF DESCRIPTION OF THE DRAWINGS

This invention is to be explained specifically with reference to one embodiment of this invention for demonstrating the effect of this invention but the invention is not restricted to the following embodiments.

FIG. 4 is a plan view illustrating a first example of an existent coordinate input device in which

FIG. 6 is a plan view illustrating a third existent example of a coordinate input device in which

DESCRIPTION OF THE PREFERRED EMBODIMENTS

Figure 1:
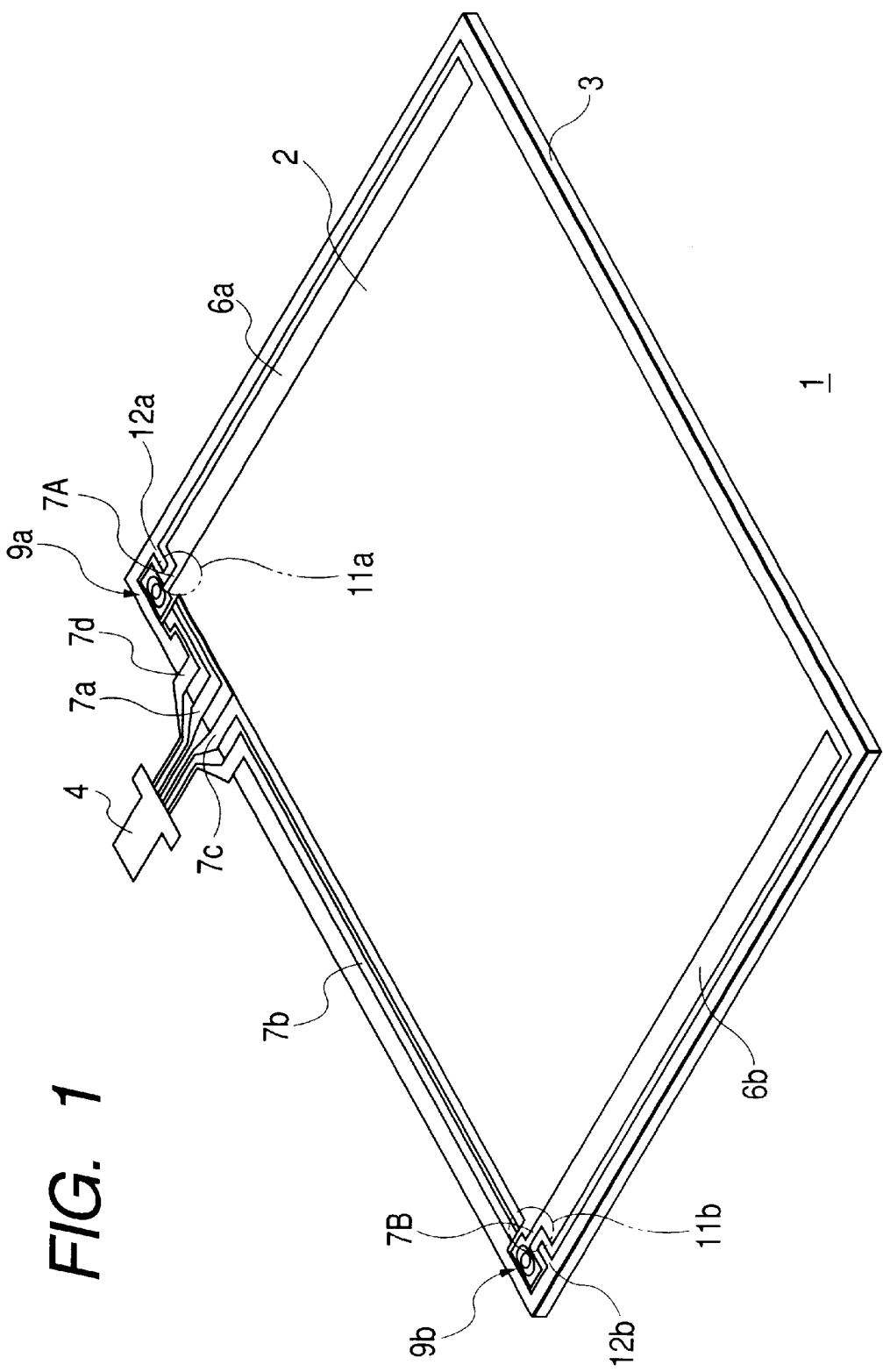
FIG. 1 is a perspective view of a coordinate input device as a preferred embodiment according to this invention.

FIG. 1 shows a perspective view of a coordinate input device 1 according to this embodiment, FIG. 2 is a plan view of an upper electrode plate 2 (first electrode plate) and a lower electrode plate 3 (second electrode plate) of a coordinate input device 1 of this embodiment.

Figure 3:
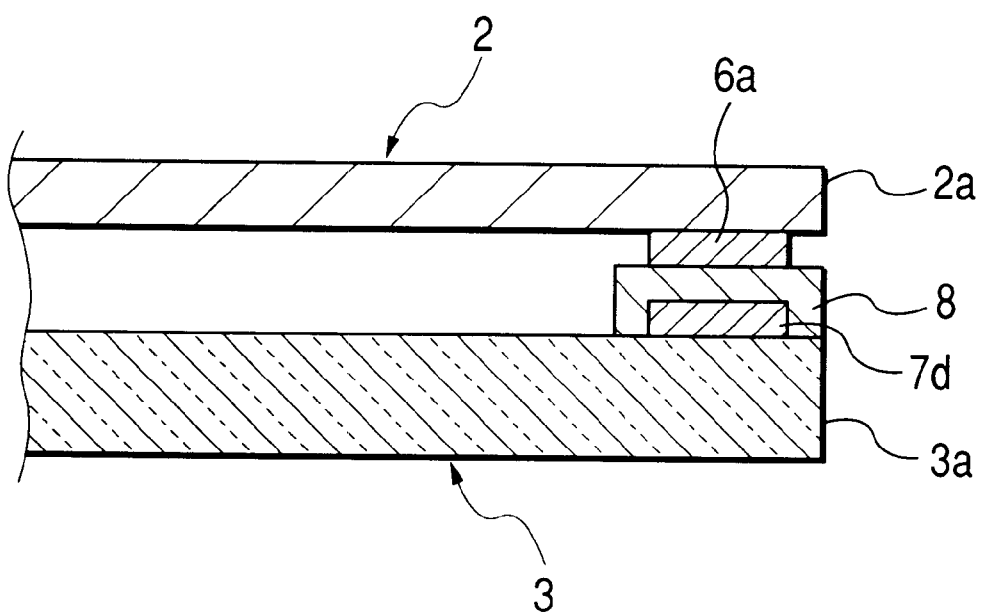
FIG. 3 is a fragmentary cross sectional view of a coordinate input device as the preferred embodiment according to this invention.
Figure 4A:
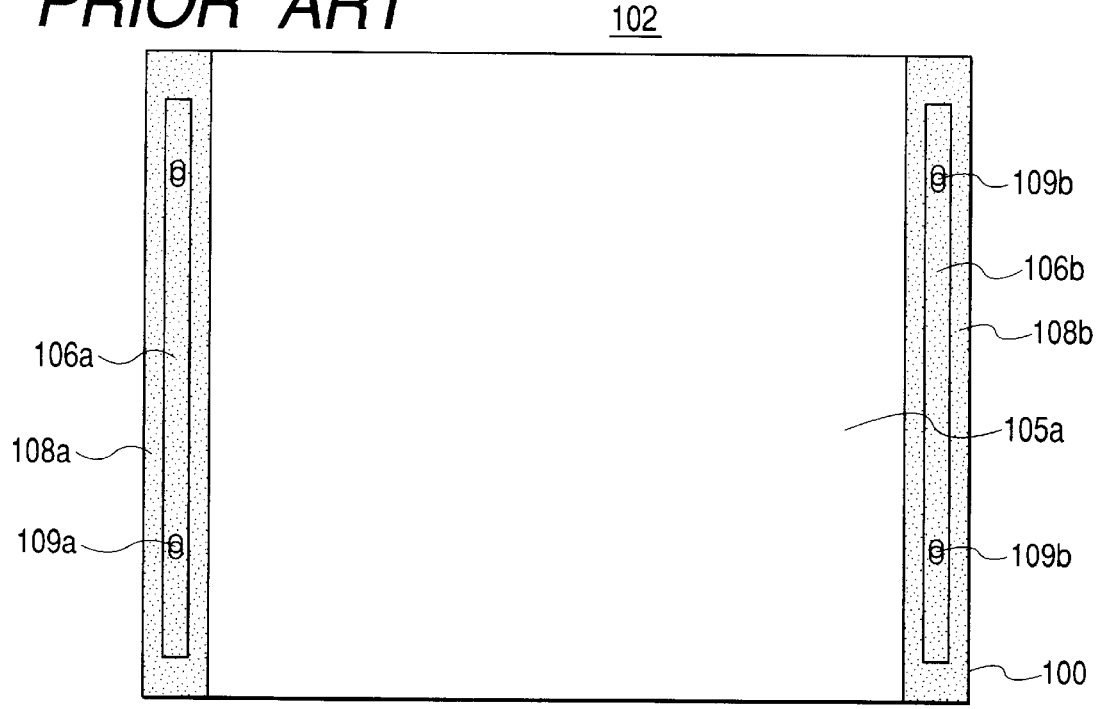
FIG. 4A is a plan view of an upper electrode plate thereof and FIG. 4B is a plan view of a lower electrode plate thereof.
Figure 4B:
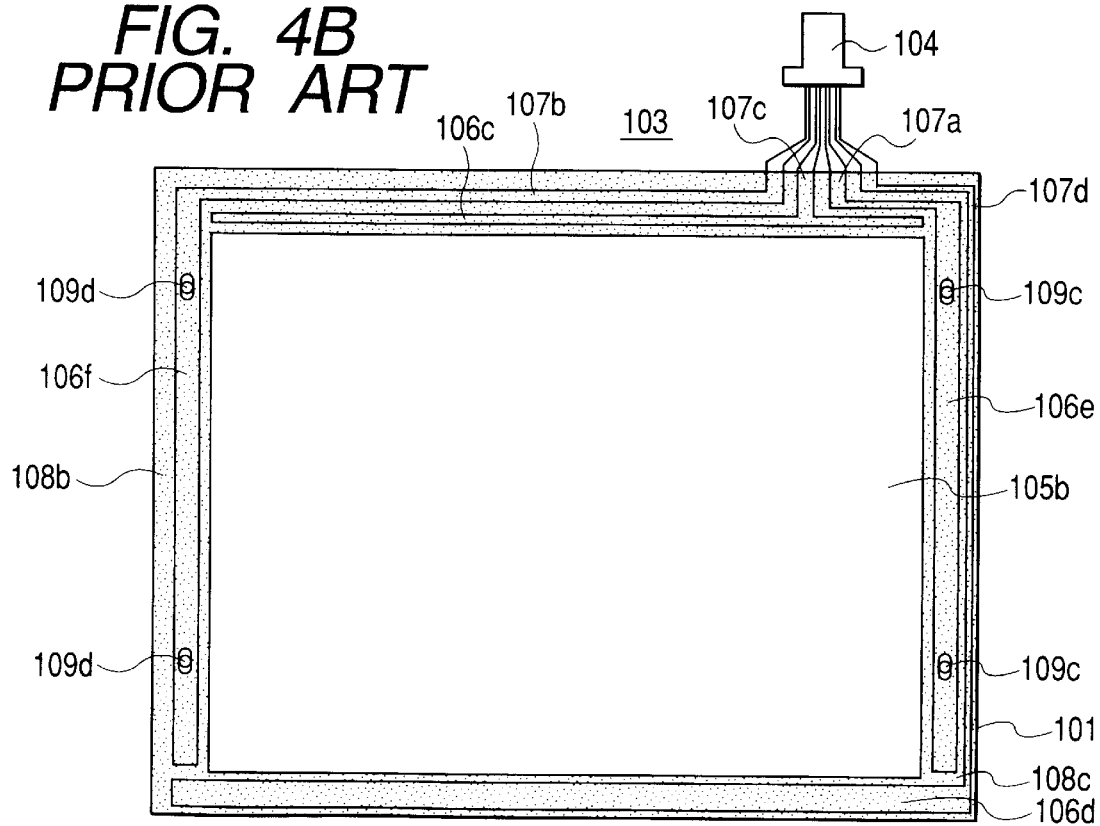
Figure 5:
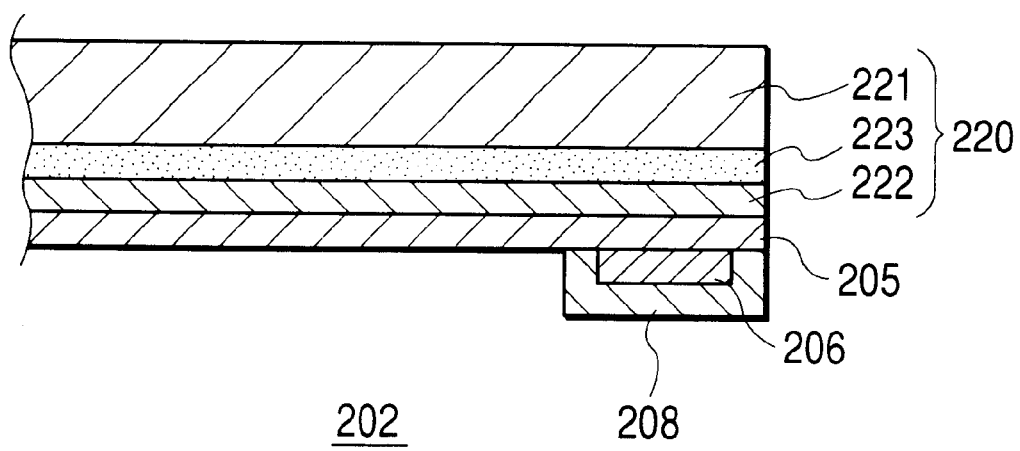
FIG. 5 is a fragmentary cross sectional view in a second existent example of a coordinate input device.

FIG. 3 is a view illustrating a fragmentary cross sectional structure of a coordinate input device according to this embodiment.

Among the constituent elements shown in FIG. 1 to FIG. 3, identical constituent elements carry the same reference numerals for which duplicate explanation is omitted or simplified.

An coordinate input device 1 of this embodiment shown in FIG. 1 has a constitution in which an upper electrode plate 2 and a lower electrode plate 3 are bonded and fixed at a predetermined position and connected with FPC 4.

Figure 2A:
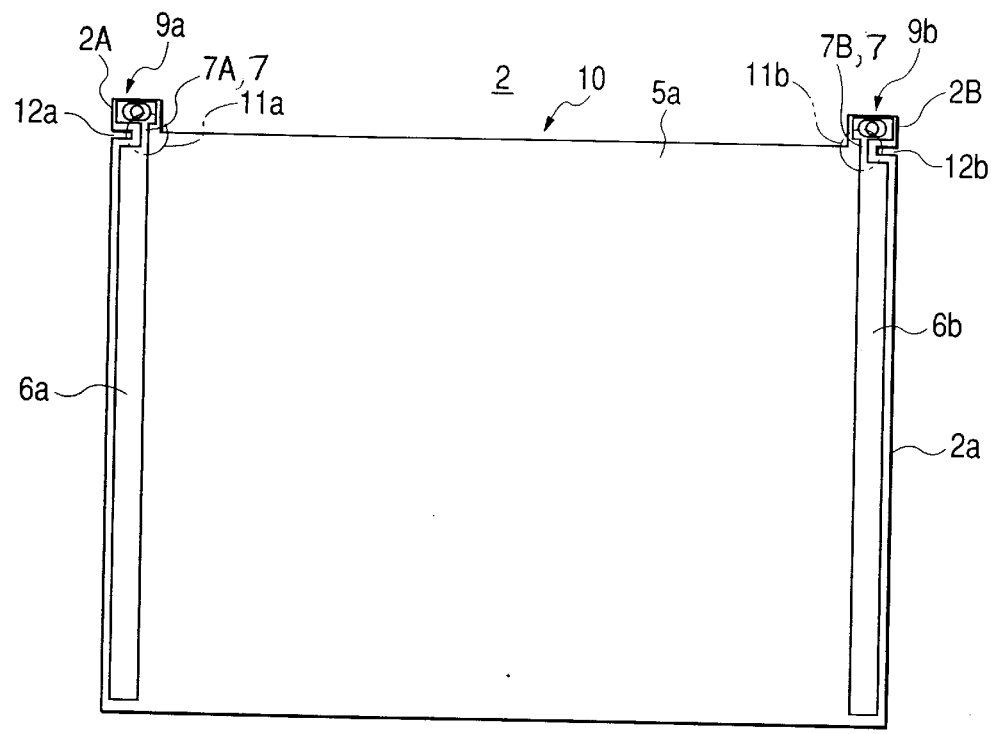
FIG. 2A is a plan view of an upper electrode plate of a coordinate input device as the preferred embodiment according to this invention.

The upper electrode plate 2, as shown in FIG. 2A, has a constitution in which a resistor layer 5a made of a conductive film such as an ITO film, electrodes 6a and 6b, wiring patterns 7A and 7B and transfer portions 9a and 9b are formed successively on a substrate 2a made of a film.

Figure 2B:
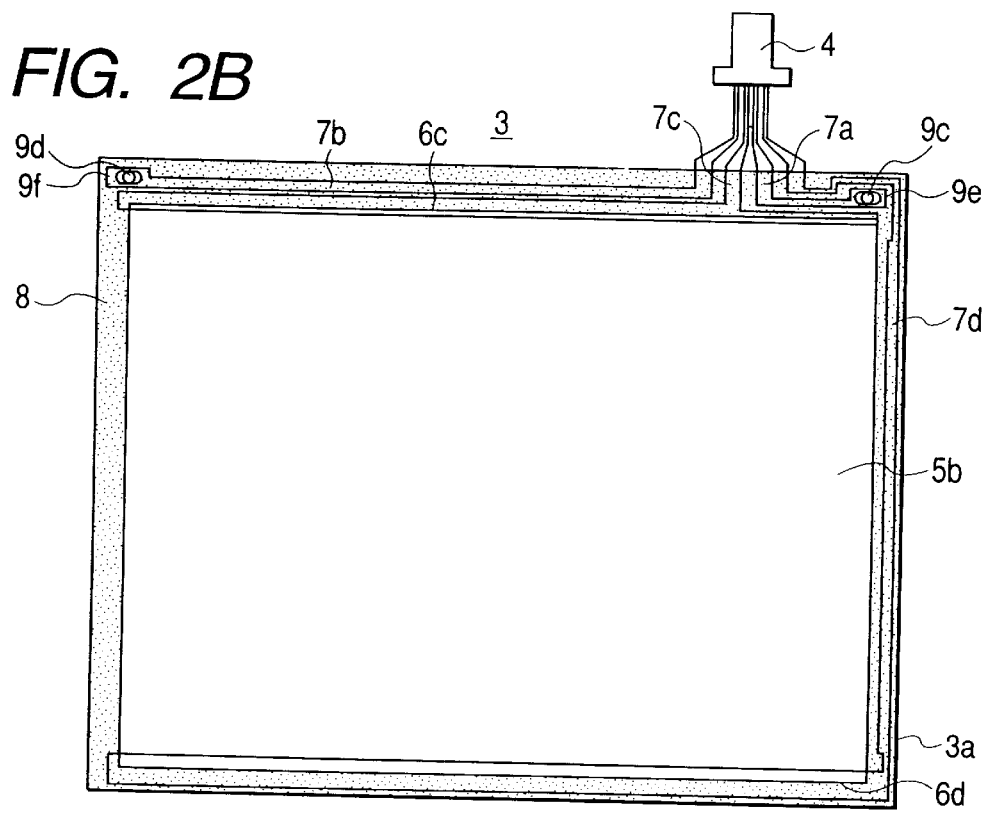
FIG. 2B is a plan view of a lower electrode plate of a coordinate input device as the preferred embodiment according to this invention.

The lower electrode plate 3, as shown in FIG. 2B, has a constitution in which a resistor layer 5b made of a conductive film such as an ITO film, electrodes 6c and 6d, wiring patterns 7a to 7d and an insulation resist 8 are formed successively on a substrate 3a made of a glass and an FPC 4 is connected with the wiring pattern 7.

In FIG. 2A, a concave portion 10 is formed on the longer side of the planer rectangular substrate 2a to define convex portions 2A and 2B on both ends of the longer side, and the transfer portions 9a and 9b are formed on the convex portions 2A and 2B.

Further, elongated rectangular electrodes 6a and 6b are formed along the shorter sides of the substrate 2a respectively, and the wiring patterns 7A and 7B narrower than the electrodes 6a and 6b are led out of the ends of the convex portions 2A and 2B of the electrodes 6a and 6b.

The transfer portions 9a and 9b situated on the convex portions 2A and 2B are connected respectively to the other ends of the wiring patterns 7A and 7B.

Further, as shown in FIG. 2A, recesses 12a and 12b are disposed between the transfer portion 9a and 9b and the electrodes 6a and 6b, respectively in the upper electrode plate 2, to form a structure in which the convex portions 2A and 2B formed with the transfer portions 9a and 9b are partially separated from other portions of the electrode plate by bridge portions 11a and 11b formed by the recesses 12a and 12b.

The width of each of the wiring patterns 7A, 7B is made one to several of each of the electrodes 6a and 6b and the patterns connects the electrodes 6a and 6b with the transfer portions 9a and 9b passing through the bridge portions 11a and 11b.

In FIG. 2B, the FPC 4 is connected near the end of the longer side of the rectangular planer substrate 3a.

The electrode 6c is formed along the longer side somewhat inward of the longer side of the substrate 3a, while the electrode 6d is formed along the longer side of the substrate 3a at a position opposing to the electrode 6c.

The wiring pattern 7c lead out of the position somewhat near the center at the right end of the electrode 6c and the wiring pattern 7d led out of the right end of the electrode 6d and formed along the shorter side of the lower electrode plate 3 are connected with the FPC 4 connected to the upper right portion of the lower electrode plate 3.

Further, the transfer forming portions 9e and 9f are disposed at the positions corresponding to the transfer portions 9a and 9b of the upper electrode plate 2 at the right upper end and the left upper end of the lower electrode plate 3, and the wiring patterns 7a and 7b led out of the transfer forming portions 9e and 9f and formed along the longer side of the electrode plate 3 are connected respectively to the FPC 4 at the upper right portion of the lower electrode plate 3.

As shown in FIG. 2B, an insulation resist 8 covering the electrodes 6c and 6d, the wiring patterns 7a to 7d and the transfer forming portions 9e and 9f are formed along the four sides of the lower electrode plate 3.

A portion not covered with the insulation resist 8 is disposed at the center of the transfer forming portions 9e and 9f and the uncovered portion constitutes the transfer portions 9c and 9d.

The upper electrode plate 2 and the lower electrode plate 3 shown in FIG. 2A and FIG. 2B are bonded at the position where the resistor layers 5a and 5b are opposed to each other, the electrodes 6a and 6b are arranged to each other at a right angle and the transfer portions 9a and 9c are abutted against the transfer portions 9b and 9a, to constitute a coordinate input device 1.

As shown in FIG. 2A, since the upper electrode plate 2 of the coordinate input device 1 according to this embodiment has a constitution that the convex portions 2A and 2B formed with the transfer portions 9a and 9b and other portions of the electrode plate 3 are partially separated by the recesses 12a and 12b and they are connected by way of the bridge portions 11a and 11b through the wiring patterns 7A and 7B passing through the bridge portions 11a and 11b, the stress caused by the difference of the heat expansion coefficient between the film substrate 2a and the glass substrate 3a is moderated by the bridge portions 11a and 11b, so that the stress exerting on the transfer portions 9a and 9b can be moderated to thereby prevent delamination of the transfer portions 9a and 9b and improve the reliability of the coordinate input device 1.

Further, in the upper electrode plate 2 of the coordinate input device 1 according to this invention, the insulation resist is not formed by the reason described above.

Figure 6A:
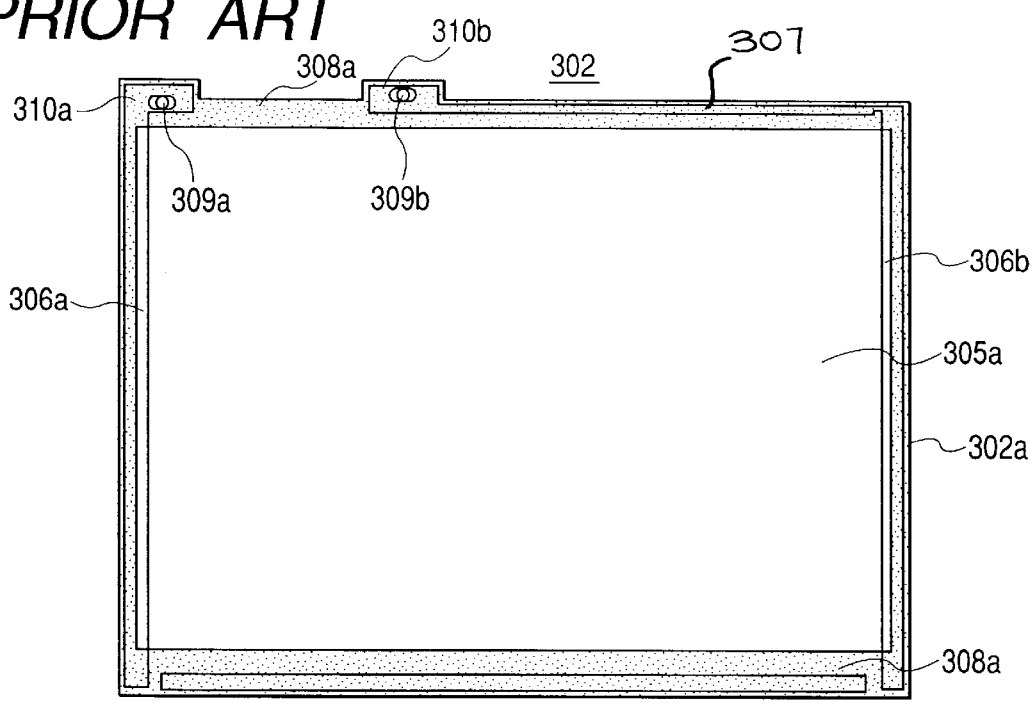
FIG. 6A is a plan view of an upper electrode plate thereof and FIG. 6B is a plan view of a lower electrode plate thereof.
Figure 6B:
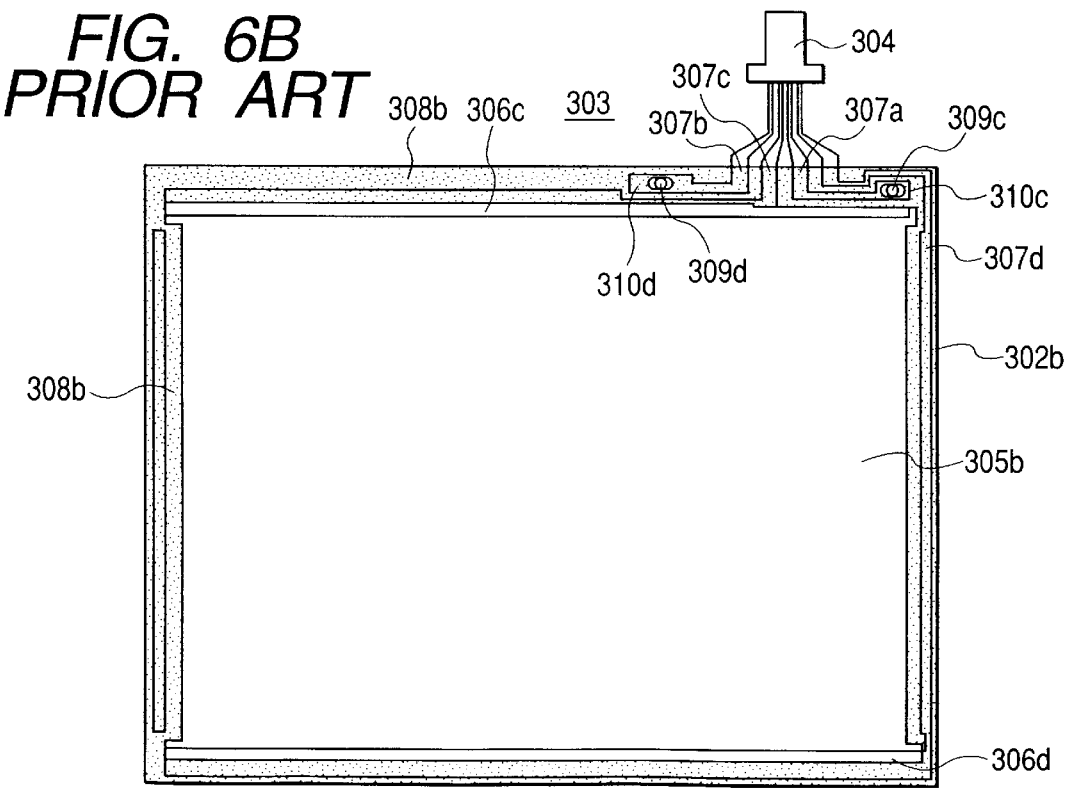
Figure 7:
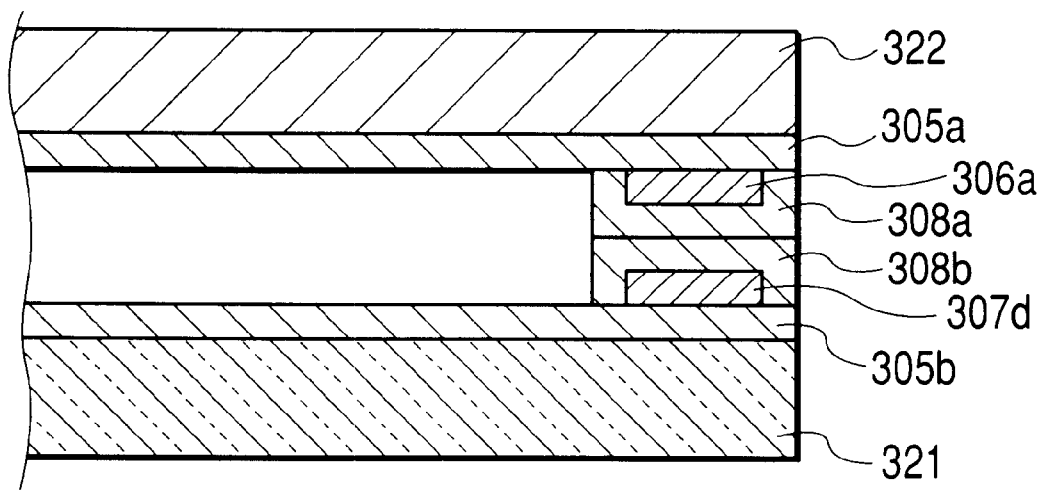
FIG. 7 illustrates a fragmentary cross sectional structure in an existent third example of a coordinate input device.

Since the stresses exerted on the transfer portions 9a and 9b are moderated by the separation of the transfer portions 9a and 9b from the electrode portion 10 by the bridge portions 11a and 11b, it is no longer necessary for the transfer portions 309a and 309b to be situated at a close position (as in the coordinate input device of the third existent example comprising the electrode plates 302 and 303 shown in FIG. 6A and FIG. 6B).

Accordingly, since the insulation resist 308a for insulating the wiring pattern 307 from the resistor layer 305a as in the upper electrode 302 of the third existent example shown in FIG. 6A is not required.

Further, in the coordinate input device 1 according to this embodiment, since the transfer portions 9a and 9b are formed on the convex portions 2A and 2B on both ends of the concave portion disposed on the longer side of the substrate 2a, the stress exerted on the transfer portions is only the stress exerted by way of the bridge portions 11a and 11b.

This is because the upper electrode plate 2 shown in FIG. 2A has a structure in which the convex portion 2A is partially separated from other portions of the upper electrode plate 2 by the bridge portion 11a and the convex portion 2B has a structure that is partially separated from other portion of the upper electrode plate 2 by the bridge portion 11b, so that the stress caused by expansion and shrinkage in each portion of the upper electrode plate 2 is always exerted on the transfer portion 9a or 9b by way of the bridge portions 11a or 11b.

Particularly, when the stress caused by the expansion or shrinkage of the convex portion 2A formed with the transfer portion 9a is exerted on the transfer portion 9b of the other convex portion 2B, since this is exerted by way of both of the bridge portions 11a and 11b, the stress is greatly moderated by the bridge portions 11a and 11b.

In the coordinate input device 1 according to this embodiment, since the bridge portions 11a and 11b are formed by providing the recesses 12a and 12b at two positions near the transfer forming portions 9a and 9b the transfer portions 9a and 9b are partially separated from the portion of the upper electrode plate 2.

The recesses 12a and 12b can be formed simultaneously and easily in the step of fabricating the film substrate into a predetermined desired shape. Accordingly, no additional step is required for forming the bridge portions 11a and 11b and increase of the cost can be prevented.

In this embodiment, while the film substrate and the glass substrate are used as the substrates for use in the upper electrode plate 2 and the lower electrode plate 3, they may be in other combination. For example, the invention is also applicable to a combination of a film substrate and a film substrate, a glass substrate and a glass substrate or to a constitution using a glass substrate for the upper electrode plate 2 and the film substrate for the lower electrode plate 3.

As has been described above specifically, since the coordinate input device according to this invention has a structure in which the transfer portion and the electrode of the first electrode plate are connected by way of the pattern wiring passing through the bridge portion disposed near the transfer portion, the stress caused by expansion or shrinkage of the electrode plate exerting on the transfer portion can be moderated, so that it can prevent delamination of the transfer portion and improve the reliability of the coordinate input device.

Further, according to this invention, since it is no more necessary to narrow the gap between the transfer portions of the coordinate input device, it is not necessary to dispose a wiring pattern along the side of the substrate not provided with the electrode in the first electrode plate.

Therefore, it is no longer necessary for the insulation resist to be used for insulating the wiring pattern from the resistor layer and it is possible to provide a coordinate input device of reduced cost by a decrease in the number of manufacturing steps.

Further, according to this invention, since the bridge portion for partially separating the convex portion from other portions of the electrode plate can be attained by a method of disposing the recesses to the substrate near the transfer portion, the bridge portion can be formed simultaneously and easily in the step of fabricating the substrate into a desired shape.

Accordingly, it is possible to prevent delamination of the transfer portion and improve the reliability of the coordinate input device with no addition of steps.

What is claimed is:

1. A coordinate input device comprising:
    a first electrode plate having a resistor layer, a pair of electrodes disposed along opposing two sides of a substrate, a wiring pattern led out of the electrodes to a vicinity of other side, and a transfer portion disposed to each of top ends of the wiring pattern; and
    a second electrode plate having a resistor layer, a pair of electrodes and a wiring pattern,
    the first and second electrode plates joined with surfaces of the resistor layers of each of the first and second electrode plates being opposed to each other and the electrodes of the first and second electrode plates being arranged at a right angle to each other,
    wherein a bridge portion, through which the wiring pattern of the first electrode plate passes, is disposed near the transfer portion of the first electrode plate, and
    wherein the bridge portion is partially separated as an independent structure from another portion of the first electrode plate by disposing a recess near the transfer portion of the first electrode plate.

2. A coordinate input device according to claim 1, wherein the first electrode plate has a concave portion formed along one side of the substrate and convex portions defined with the concave portion on both sides thereof and transfer portions are disposed on the convex portions.

3. A coordinate input device comprising:
    a first electrode plate having a resistor layer, a pair of electrodes disposed along opposing two sides of a substrate, a wiring pattern led out of the electrodes to a vicinity of other side, and a transfer portion disposed to each of top ends of the wiring pattern; and
    a second electrode plate having a resistor layer, a pair of electrodes and a wiring pattern,
    the first and second electrode plates joined with surfaces of the resistor layers of each of the first and second electrode plates being opposed to each other and the electrodes of the first and second electrode plates being arranged at a right angle to each other,
    wherein a bridge portion, through which the wiring pattern of the first electrode plate passes, is disposed near the transfer portion of the first electrode plate, and
    wherein the first electrode plate has a concave portion formed along one side of the substrate and convex portions defined with the concave portion on both sides thereof and transfer portions are disposed on the convex portions.

* * * * *